June 23, 1970 F. A. GOES 3,516,569
RADIATOR CAP FOR VEHICLES
Filed Jan. 24, 1969
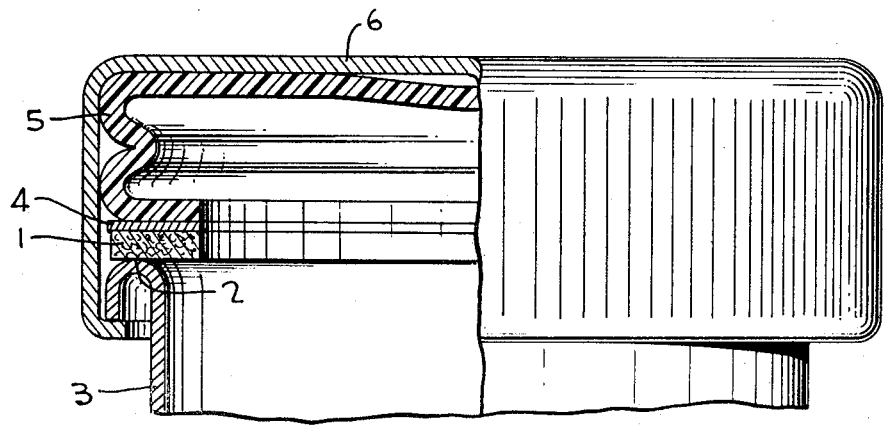
INVENTOR,
FRIEDRICH A. GOES
BY Watson, Cole, Grindle & Watson
ATTORNEYS

United States Patent Office 3,516,569
Patented June 23, 1970

3,516,569
RADIATOR CAP FOR VEHICLES
Friedrich A. Goes, Wolfsburg, Germany, assignor to Volkswagenwerk Aktiengesellschaft, Wolfsburg, Germany
Filed Jan. 24, 1969, Ser. No. 793,702
Claims priority, application Germany, Jan. 24, 1968, 1,655,660
Int. Cl. B65d 41/06
U.S. Cl. 220—40                                   7 Claims

ABSTRACT OF THE DISCLOSURE

A tank cover to fit by bayonet lock over the filling collar of the tank and having a packing ring and a dome-shaped packing member in the cover and contacting a rim of the filling collar to close the latter.

---

The invention relates to closure or radiator or fuel caps for internal combustion engines.

In closure caps for the filling connection for radiators or fuel tanks, there is provided usually a spring-pressed packing disc to press against the upper edge or rim of the filling spout. When the frictional force for closing the cover of the bayonet lock shall be as small as possible on the rim of the filling connection, it is necessary that the press force for tight connection shall be small. Covers of such construction are only tight when the pressure force shall be ca. 0.2 kilogram per square centimeter.

Furthermore the forceful loss of fluid by non-tight connection of the cover must be avoided by preventing rebound of the cover. By force of the fluid column in fuel tanks of internal combustion engines and pressure build-up upon lowering compression of the fuel tank, there could result a pressure on the fuel tank cover which could exceed 0.2 kilogram per square centimeter.

It is therefore an object of the invention to increase the tight closure pressure for tank caps above the bursting pressure of the tank closure without affecting the closure tightness. It is a further object of the invention to provide for quick and safe opening and closing of the cover without the provision of screw-thread connection between the fillling spout and the cover to thus provide quick opening and closing.

The invention thus provides a closure cap for tanks having a tight packing disc or ring with a dome-like rubber or artificial shell member which will permit relative movement between the packing ring disc and the closure cap and which is flexible and forms a tight connection between the packing disc and the closure cap.

Further objects will be apparent from the following description when considered in connection with the accompanying drawing in which the single figure shows a side view partly in section of the radiator or tank cap according to the invention.

The ring-shaped packing disc 1, extends over and around the upper packing rim 2 of the filling support or pipe 3. This is strengthened by a support ring or washer 4 and a rubber or artifiical packing disc 5 which is dome-like and provided over the ring 4. The closure cap 6 holds the disc 1, washer 4 and packing 5 together, protects the packing 5 and extends over the inner pressure component of the bayonet-like closure. The single separation part between the inner space of the tank and the outer space of the tank, is thus the packing place itself. The packing bulge 5 can thus form by itself its own spring action in order to apply thereto the preliminary packing force.

From the figure of the drawing, it is to be assumed that the force on the upper side of the packing disc 1 has a lasting force with increasing inner tank force since the diameter $D_2$ is greater than the diameter $D_1$.

Packing closure materials are in themselves known in which a ring-shaped packing surface has certain mentioned characteristics. Such closures show or indicate however safety valve operation with already safety valve operation at low inner pressures, which, according to the invention, however do not strive for absolute tightness.

The tank caps with ventilation (aeration of the inner space of the tank) have the aeration hole or opening in the shell in such a way that the free through flow at inner tank pressures of somewhat 0.2 to 1.0 kp./cm.$^2$ is assured and remains so at higher inner pressures, that is differential pressures inflated to form the bulging portion and the safety ventilation opening by low inner pressures, will provide absolute tight contact.

The tank cap cover with ventilation (aeration of tank inner space) will provide the aeration opening in the shell so that a free flow will be maintained at inner tank pressures up to between 0.2 to 1.0 kp./cm.$^2$. At higher inner pressures and differential pressures the shell will expand and the ventillation opening will, for example, be hermetically closed by the walls of the shell.

I claim:
1. A tank cover with the tank having an outer rim comprising a closure cap of dome-shape, a packing ring in the cap adapted to contact the rim and a dome-shaped packing member in the closure cap and composed of a flexible material to form a tight connection between the packing ring and the closure cap.
2. A tank cover according to claim 1, in which the dome-shaped packing member is composed of rubber.
3. A tank cover according to claim 1, in which the dome-shaped packing member is composed of an artificial material.
4. A tank cover according to claim 1, in which the closure cap is composed of metal.
5. A tank cover according to claim 1, in which the dome-shaped packing member extends throughout the diameter of the closure cap.
6. A tank cover according to claim 1, in which the dome-shaped packing member extends around the sides of the closure cap and over an inner end surface of the closure cap.
7. A tank cover according to claim 1, in which the dome-shaped packing member has a circumferential side portion to act as a spring pressing against the packing ring.

References Cited
UNITED STATES PATENTS 3,432,065   3/1969   Bugha _____ 220—40
3,448,882   6/1969   Roy _____ 220—44 XR GEORGE T. HALL, Primary Examiner U.S. Cl. X.R.
220—44, 46